US00RE48122E

(19) United States
(12) Reissued Patent
Bagci et al.

(10) Patent Number: US RE48,122 E
(45) Date of Reissued Patent: Jul. 28, 2020

(54) FILTER ELEMENT ENDPLATE DEFINING INFLOW AND OUTFLOW FLOW PATHS

(71) Applicant: CUMMINS FILTRATION IP, INC., Columbus, IN (US)

(72) Inventors: Ismail Bagci, Cookeville, TN (US); Aaron Wells, Cookeville, TN (US); Amos Samuel, Cottage Grove, MN (US)

(73) Assignee: CUMMINS FILTRATION IP, INC., Columbus, IN (US)

(21) Appl. No.: 16/056,826

(22) Filed: Aug. 7, 2018

Related U.S. Patent Documents

Reissue of:
(64) Patent No.: 9,447,759
Issued: Sep. 20, 2016
Appl. No.: 13/827,992
Filed: Mar. 14, 2013

U.S. Applications:
(60) Provisional application No. 61/658,603, filed on Jun. 12, 2012.

(51) Int. Cl.
*F02M 37/22* (2019.01)
*B01D 27/06* (2006.01)
*B01D 27/08* (2006.01)

(52) U.S. Cl.
CPC ..... *F02M 37/22* (2013.01); *B01D 27/06* (2013.01); *B01D 27/08* (2013.01); *B01D 2201/291* (2013.01)

(58) Field of Classification Search
CPC ..... F02M 37/22; B01D 27/06; B01D 27/08; B01D 2201/291; B01D 2201/295; B01D 2201/301; B01D 2201/304
See application file for complete search history.

(56) References Cited

U.S. PATENT DOCUMENTS

| | | | |
|---|---|---|---|
| 4,645,601 | A | 2/1987 | Regunathan et al. |
| 5,591,332 | A | 1/1997 | Reid et al. |
| 5,653,871 | A | 8/1997 | Thomsen |
| 6,120,685 | A | 9/2000 | Carlson et al. |
| 6,238,554 | B1 | 5/2001 | Martin, Jr. et al. |
| 6,533,931 | B1 | 3/2003 | Reid |

(Continued)

FOREIGN PATENT DOCUMENTS

| | | |
|---|---|---|
| CN | 201350369 | 11/2009 |
| EP | 0 718 021 A1 | 6/1996 |

(Continued)

OTHER PUBLICATIONS

First Office Action for Chinese Patent Appplication No. 201380026914.9 dated May 5, 2016, 7 pages.

(Continued)

*Primary Examiner* — Carlos N Lopez
(74) *Attorney, Agent, or Firm* — Foley & Lardner LLP

(57) ABSTRACT

A filter element for fuel, oil or other engine fluids, with an endplate that is designed to create flow paths for both clean and dirty regions. The filter element is part of a spin-on filter that is attachable to a filter head in an engine and that filters fuel, oil or other engine fluids. A pre-fill cap can be integrally incorporated onto the endplate to permit pre-filling and installation without removing components.

22 Claims, 9 Drawing Sheets

(56) References Cited

U.S. PATENT DOCUMENTS

| | | | | |
|---|---|---|---|---|
| 6,554,140 | B2 * | 4/2003 | Steger et al. | 210/438 |
| 7,166,215 | B2 | 1/2007 | Reid | |
| 7,510,653 | B2 | 3/2009 | Martin et al. | |
| 7,563,368 | B2 | 7/2009 | Martin et al. | |
| 8,146,751 | B2 | 4/2012 | Hawkins et al. | |
| 8,167,966 | B2 * | 5/2012 | Amirkhanian | B01D 46/008 210/470 |
| 2002/0074281 | A1 | 6/2002 | Steger, Jr. et al. | |
| 2004/0094464 | A1 | 5/2004 | Baumann et al. | |
| 2007/0181481 | A1 * | 8/2007 | Reynolds et al. | 210/304 |
| 2008/0308481 | A1 | 12/2008 | Wieczorek et al. | |
| 2009/0001004 | A1 | 1/2009 | McCormick et al. | |
| 2009/0114588 | A1 * | 5/2009 | Bagci | B01D 35/153 210/418 |
| 2009/0127198 | A1 * | 5/2009 | Salvador et al. | 210/650 |
| 2010/0101993 | A1 | 4/2010 | Wells et al. | |

FOREIGN PATENT DOCUMENTS

| | | | | | |
|---|---|---|---|---|---|
| JP | 08290014 | A | * | 11/1996 | B01D 29/21 |
| JP | 2017074589 | A | * | 4/2017 | B01D 35/005 |
| JP | 2017127858 | A | * | 7/2017 | B01D 35/005 |
| WO | WO 2011/107265 | A1 | | 9/2011 | |
| WO | 2013/123657 | A1 | | 8/2013 | |
| WO | WO 2013/123657 | | | 8/2013 | |
| WO | WO 2013/0188036 | A1 | | 12/2013 | |

OTHER PUBLICATIONS

International Search Report and Written Opinion for PCT/US2013/041114, dated Aug. 14, 2013, 9 pages.

* cited by examiner

FILTER ELEMENT ENDPLATE DEFINING INFLOW AND OUTFLOW FLOW PATHS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

A filter element, and a filter that includes the filter element, for fuel, oil or other engine fluids, with an endplate that is designed to create flow paths for both clean and dirty regions.

BACKGROUND

It is known that engine filters have an inlet flow path for dirty fluid that needs to be filtered, and an outlet flow path for clean fluid that has been filtered by the filter media of the filter. The inlet and outlet flow paths are typically sealed from each other to prevent dirty fluid from entering the outlet flow path and mixing with the clean fluid which can degrade downstream components. In spin-on filters, the inlet and outlet flow paths are typically at the same end of the filter, and in many spin-on designs, the inlet and outlet flow paths are defined by a nutplate of the filter.

In some fuel filters, it is advantageous to pre-fill the dirty side of the filter with dirty fuel. To permit pre-filling, it is known to supply a cap that is used to close off the clean fuel outlet during pre-filling, with the cap then being discarded.

SUMMARY

A filter element, and a filter that includes the filter element, for fuel, oil or other engine fluids, is described that includes an endplate that is designed to create flow paths for both clean and dirty regions.

In one particular embodiment, the filter element is part of a spin-on filter that is attachable to a filter head in an engine and that filters fuel, oil or other engine fluids. However, the concepts described herein can be applied to other types of filters, attachable to other attachment structures and that filter other fluids.

In the case of a fuel filter, a pre-fill cap can be integrally incorporated onto the endplate to permit pre-filling and installation within removing components.

A protruding component on the end endplate works in conjunction with a nutplate of the filter housing to create flow paths, for example inlet flow paths for dirty fluid to be filtered. A separate sleeve on the endplate forms a separate flow path, for example an outlet flow path for fluid that has been filtered.

In one embodiment, the top endplate can have external ribs that separate the endplate from the nutplate and allow flow of the dirty fluid around the filter cartridge. The clean fluid would then be diverted around a region that essentially blocks incoming flow from the clean side but still allows clean fluid out. The one piece molded endplate would have a top projecting portion that would interface with a female port in the filter head. The one-piece endplate design would define flow paths past the nutplate, a male protruding flow passage, as well as an o-ring groove for sealing.

In another embodiment, a filter element that is applicable to different fluid applications, including fuel and lubrication oil, includes a ring of filtration media having a first end and a second end and circumscribing a central cavity. A first endplate is sealingly attached to the first end of the filtration media, and a second endplate is sealingly attached to the second end of the filtration media. The second endplate includes a sleeve extending upwardly therefrom in a direction away from the first endplate, and the sleeve defines a fluid flow passageway through the second endplate that is in fluid communication with the central cavity. In one embodiment of an outside-in flow filter element, the fluid flow passageway formed by the sleeve is a clean fluid outlet for filtered fluid. However, the filter element could be configured for inside-out flow as well, in which case the fluid flow passageway in the sleeve can be a dirty fluid inlet.

A radial outward facing groove can be formed in the sleeve for receiving an o-ring seal therein. In addition, a plurality of ribs can be formed on the second endplate and extend upwardly therefrom in the same direction as the sleeve. Each rib can have a first end integral with and extending from an outside surface of the sleeve and a second end adjacent to an outer perimeter edge of the second endplate. The ribs create flow paths, for example inlet flow paths for dirty fluid to be filtered in the case of a filter configured for outside-in flow or flow paths for filtered fluid in the case of a filter configured for inside-out flow.

In the case of a fuel filter element, a pre-fill cap can be integrally formed with and close an end of the sleeve. The pre-fill cap can include an outer perimeter edge that overhangs a portion of the sleeve, and at least one hole or a plurality of holes are formed in the sleeve between the pre-fill cap and the radial outward facing groove that place the fluid flow passageway in communication with an exterior of the sleeve. The pre-fill cap closes the end of the sleeve to act as a deflector diverting contaminated filling fluid to the dirty chamber of the filter during a pre-filling procedure.

The filter element is disposed within a housing to form a filter. The housing can have a closed first end, a second open end that can be closed by a nutplate, and an interior space in which the filter element is disposed. The nutplate can include a threaded sleeve having threads for threadably connecting the filter to a filter head, with the threaded sleeve having an inner end facing toward the interior space. Prior to installation of the filter element, the inner end of the threaded sleeve engages the upper end of the ribs.

In another embodiment, a filter element can include a ring of filtration media having a first end and a second end and circumscribing a central cavity, a first endplate sealingly attached to the first end of the filtration media, and a second endplate sealingly attached to the second end of the filtration media. The second endplate includes a sleeve extending upwardly therefrom in a direction away from the first endplate, the sleeve defining a fluid flow passageway through the second endplate that is in fluid communication with the central cavity. A radial outward facing groove is formed in the sleeve that receives a seal therein. In addition, a plurality of ribs are formed on the second endplate and extend upwardly therefrom in the same direction as the sleeve, each rib extending from a first end on an outside surface of the sleeve to a second end adjacent an outer perimeter edge of the second endplate.

In still another embodiment, a filter element can include a ring of filtration media extending along a longitudinal axis and having a first end and a second end and circumscribing a central cavity, a first endplate sealingly attached to the first end of the filtration media, and a second endplate sealingly attached to the second end of the filtration media. The second endplate can include a first structure extending upwardly therefrom in a direction away from the first endplate coaxial to the longitudinal axis, where the first structure defines a fluid flow passageway through the second endplate that has an inlet that is in fluid communication with the central cavity and an outlet. A seal can be disposed on the structure that is positioned to seal with a filter head. In addition, second structure is integrally formed on the second endplate that define a plurality of fluid flow paths along the top of the second endplate. The fluid flow paths are disposed on the same side of the second endplate as the first structure, and the seal is positioned between the outlet of the fluid flow passageway and the fluid flow paths and the seal is positioned between the outlet and the second endplate.

The second structure can be any structure that is integrally formed with the second endplate and that defines the fluid flow paths. In one non-limiting example, the second structure comprises ribs.

In still another embodiment, a filter includes a housing having a closed first end, a second end and an interior space. A nutplate is fastened to the second end of the housing, with the nutplate including a threaded sleeve having interior threads for threadably connecting the filter to a filter head. The threaded sleeve has an inner end facing toward the interior space. In addition, a filter element is disposed in the interior space. The filter element includes a ring of filtration media disposed in the interior space and extending along a longitudinal axis and having a first end and a second end and circumscribing a central cavity, a first endplate sealingly attached to the first end of the filtration media, and a second endplate sealingly attached to the second end of the filtration media between the first endplate and the nutplate. The second endplate includes a first structure extending upwardly therefrom in a direction away from the first endplate and radially inward from the threaded sleeve. The first structure can be coaxial to the longitudinal axis, and defines a fluid flow passageway through the second endplate that has an inlet that is in fluid communication with the central cavity and an outlet. A seal is disposed on the structure that is positioned to seal with the filter head when the filter is connected to the filter head. In addition, second structure integrally formed on the second endplate defines a plurality of fluid flow paths along the top of the second endplate. The fluid flow paths are disposed on the same side of the second endplate as the first structure, and the seal is positioned between the outlet of the fluid flow passageway and the fluid flow paths and the seal is positioned between the outlet and the second endplate.

The second structure can be any structure that is integrally formed with the second endplate and that defines the fluid flow paths, for example ribs.

DRAWINGS

DETAILED DESCRIPTION

Figure 1:
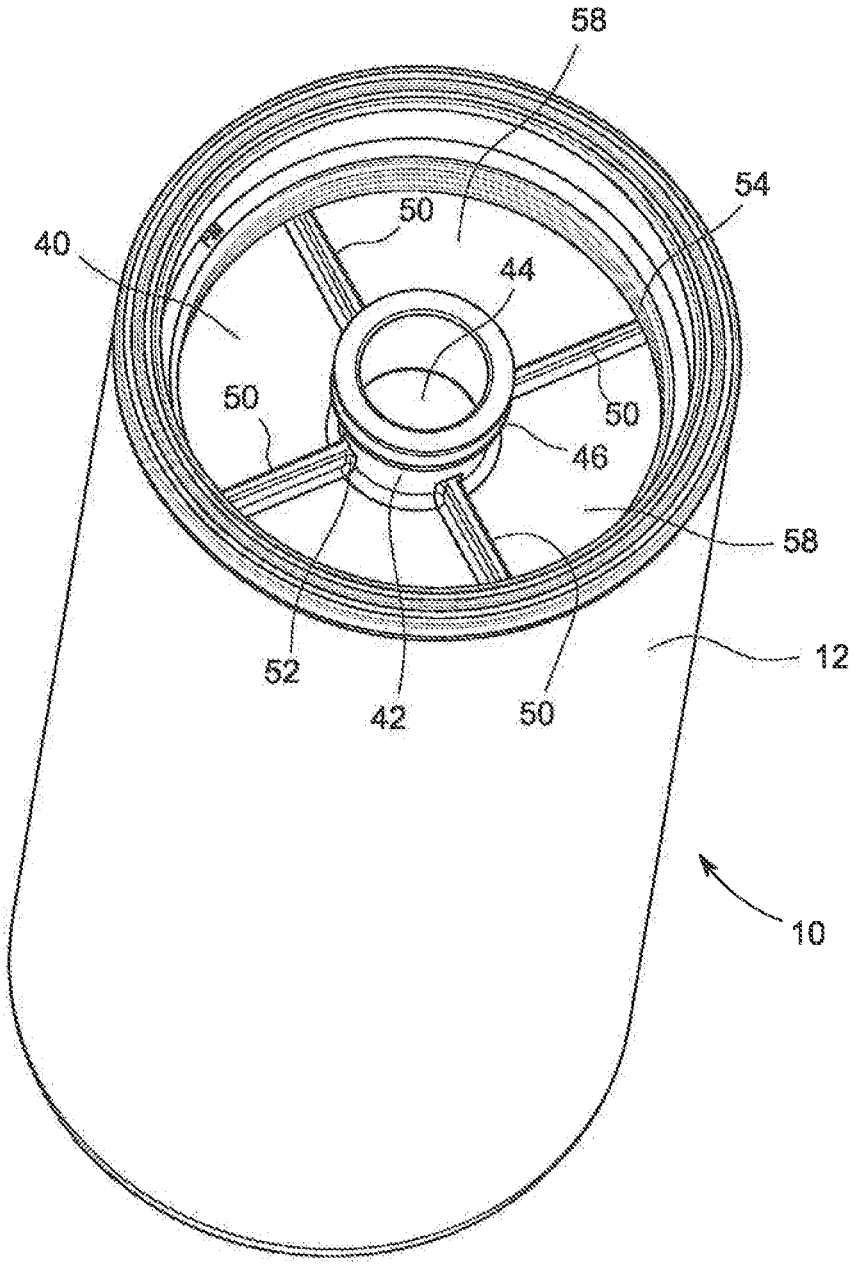
FIG. 1 is a perspective view of a lubrication oil filter described herein.

With reference to FIGS. 1-4, an embodiment of a lubrication oil filter 10 is illustrated that includes a housing 12 having a closed first end 14, a second end 16 and an interior space 18. A nutplate 20 is fastened to the second end of the housing. The nutplate includes a threaded sleeve 22 having threads 24 for threadably connecting the filter 10 to a filter head 5 (FIG. 4), the threaded sleeve having an inner end 26 facing toward the interior space that prior to installation of the filter element to a filter head is engaged with a filter element 25 disposed in the interior space 18.

Figure 2:
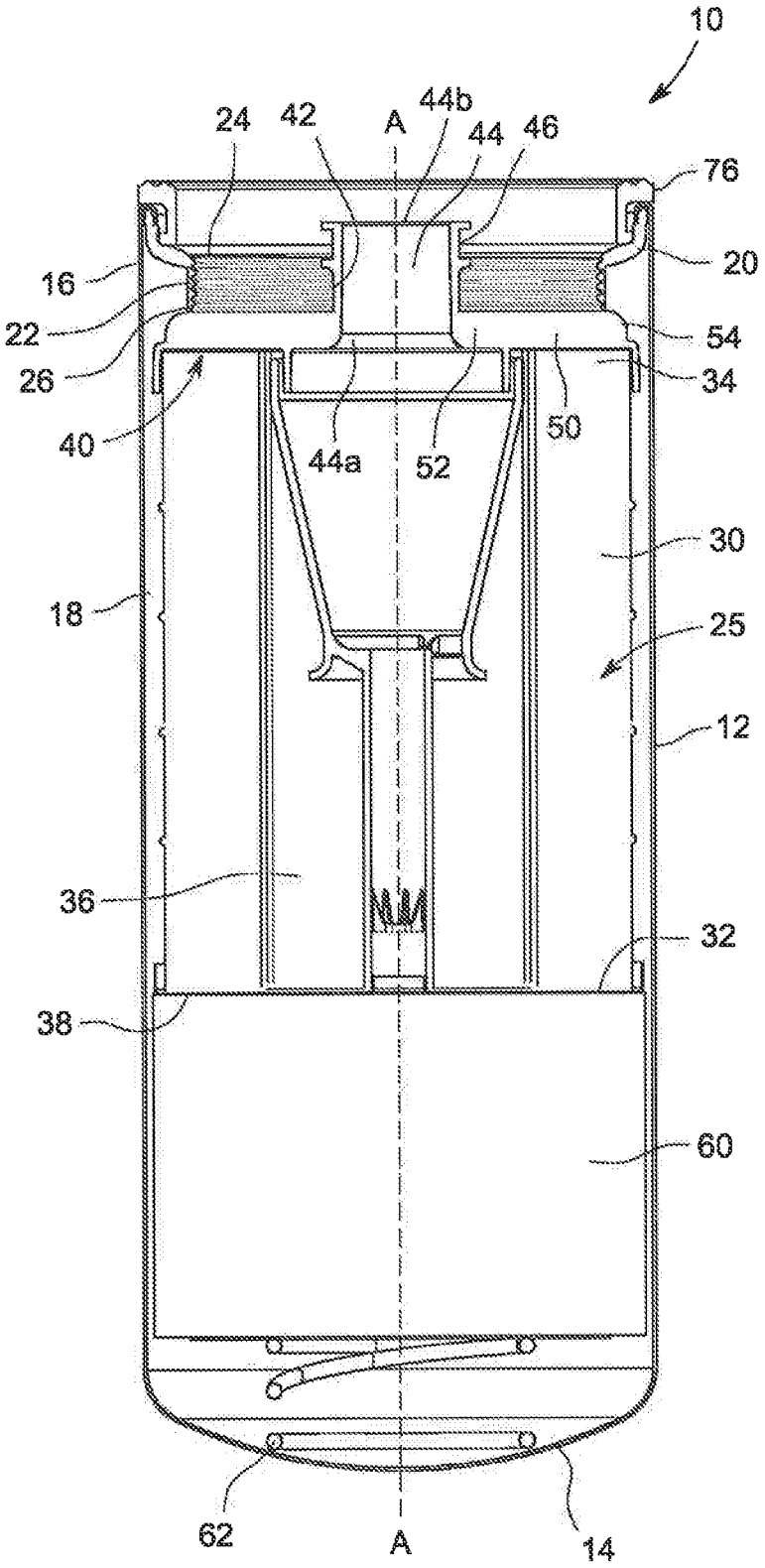
FIG. 2 is a cross-sectional view of the filter of FIG. 1.
Figure 3:
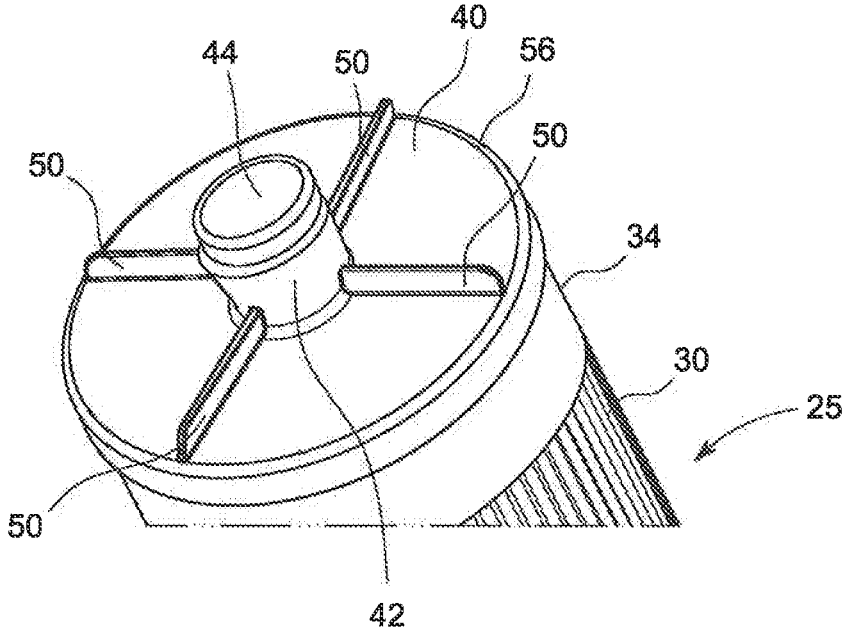
FIG. 3 is a close-up view of the end of the lubrication oil filter of FIG. 1.

With reference to FIGS. 2 and 3, the filter element 25 includes a ring of filtration media 30 with a first end 32, a second end 34, and that extends along a longitudinal axis A-A and circumscribes a central cavity 36. A first endplate 38 is sealingly attached to the first end 32 of the filtration media 30. The endplate 38 generally closes the end 32 of the media 30 to constrain the fluid so that it flows generally radially through the media.

In the illustrated example, an optional slow release oil additive mechanism 60, for example an additive canister, and/or secondary filtration disks with embedded additives, can be disposed between the first endplate 38 and the closed end 14 of the housing 12. Examples of oil filters with additive mechanisms are disclosed in U.S. Pat. Nos. 6,238,554, 7,510,653, and 7,563,368. U.S. Pat. No. 7,510,653 is incorporated by reference herein in its entirety.

Figure 4:
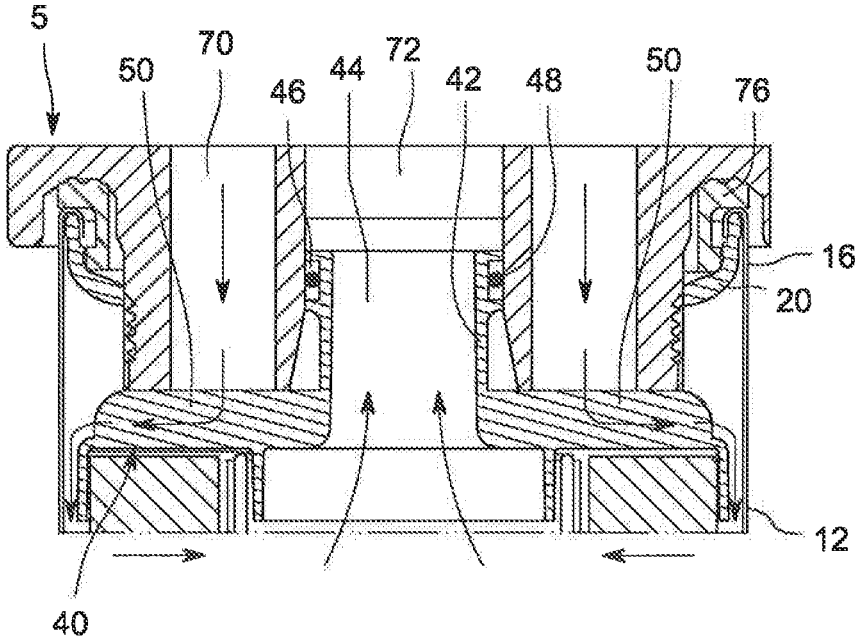
FIG. 4 is close-up view of the end of the lubrication oil filter mounted to a filter head.
Figure 5:
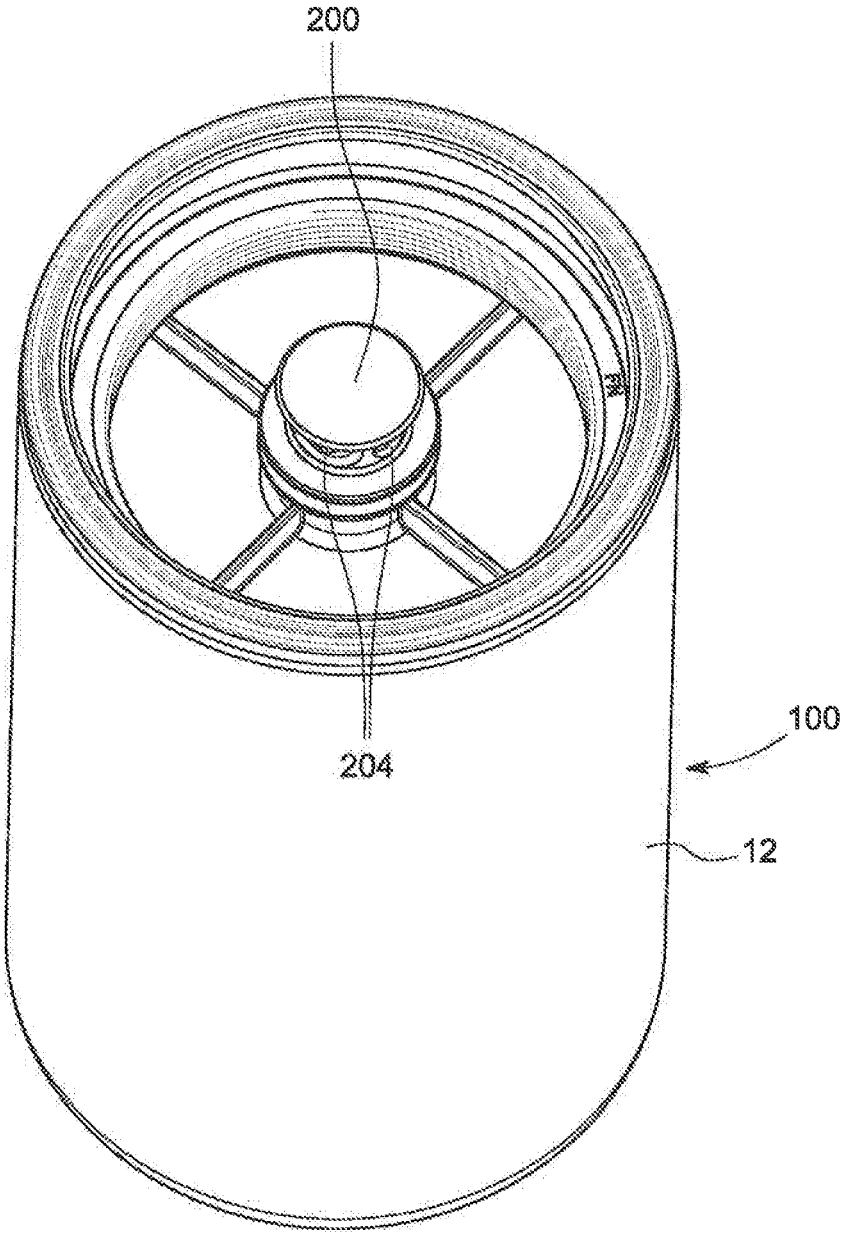
FIG. 5 is a perspective view of a fuel filter described herein.
Figure 6:
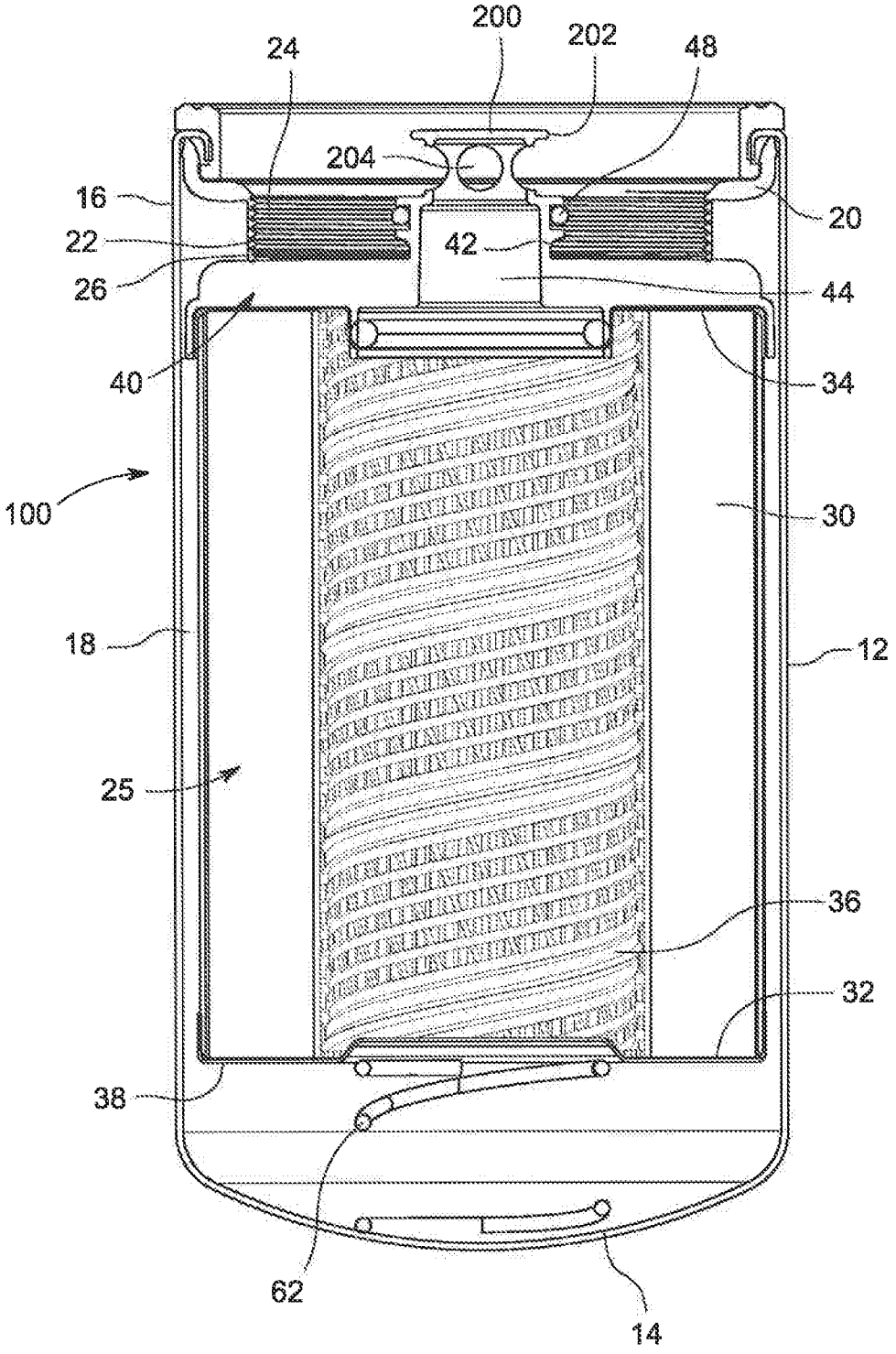
FIG. 6 is a cross-sectional view of the filter of FIG. 5.
Figure 7:
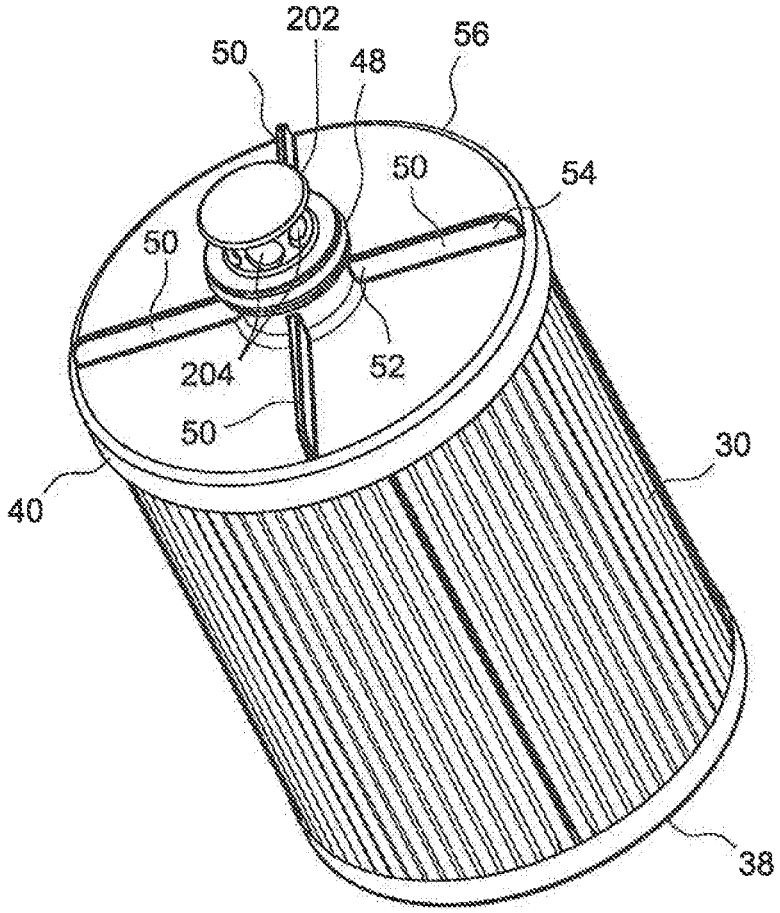
FIG. 7 is a close-up view of the filter element of the fuel filter of FIG. 5.

A coil spring 62 is disposed within the housing 12 and is suitably engaged with the filter element 25 to bias the filter element 25 into engagement with the nutplate 20. However, as shown in FIG. 4, upon installation of the filter element to the head 5, the filter element 25 will typically get displaced downward away from the head to create a gap between the inner end 26 of the threaded sleeve 22 and ribs on the filter element 25 as discussed further below. In the illustrated example, the spring 62 is disposed between the first endplate and the closed first end 14, and in particular between the additive mechanism 60 and the first end 14. The spring 62 biases the filter element against the nutplate 20 via the additive mechanism 60.

A second endplate 40 is sealingly attached to the second end 34 of the filtration media 30 between the first endplate 38 and the nutplate 20. The endplate 40 generally closes the end 34 of the media 30 to constrain the fluid so that it flows generally radially through the media.

The first and second endplates 38, 40 can be formed of a suitable material, for example plastic, with the ends 32, 34 of the media 30 attached to the endplates in any suitable manner, for example by using an adhesive or embedding the ends of the media into the endplates.

The second endplate 40 includes an integrally formed first structure 42 in the form of a sleeve extending upwardly therefrom in a direction away from the first endplate coaxial to the longitudinal axis A-A and radially inward from the threaded sleeve 22. The sleeve 42 is generally hollow and defines a fluid flow passageway 44 through the second endplate that is also coaxial to the longitudinal axis A-A. The passageway 44 includes an inlet 44a that is in fluid communication with the central cavity 36 and an outlet 44b.

A seal 48 is suitably disposed on the sleeve 42 for sealing with the filter head 5 as shown in FIG. 4 to seal filtered fluid from unfiltered fluid. For example, the sleeve 42 can include a radial outward facing groove 46 integrally formed in the sleeve 42 for receiving the seal, for example an o-ring seal, therein. However, any type of seal that is located anywhere on the sleeve 42 can be used, as long as an adequate seal with the filter head 5 is achieved to seal filtered fluid from unfiltered fluid.

Second structure 50 is integrally formed on the second endplate 40 that define a plurality of fluid flow paths 58 along the top of the second endplate. The second structure 50 can take any form of structure that defines the fluid flow paths 58. In the illustrated example, the second structure 50 comprises a plurality of ribs.

The plurality of ribs 50 are integrally formed on the second endplate 40 and extend upwardly therefrom in the same direction as the sleeve 42. The ribs 50 are provided to define the fluid flow paths 58 along the top of the second endplate. In particular, as best seen in FIGS. 1 and 3, each rib 50 extends in a radial direction from a first end 52 that is integrally formed with an outside surface of the sleeve 42 to a second end 54 adjacent to an outer perimeter edge 56 of the second endplate.

The ribs 50 have a radial length such that the second end 54 is radially outside of the threaded sleeve 22 as shown in FIGS. 2 and 4. Prior to installation of the filter element, the inner end 26 of the threaded sleeve 22 is engaged with an upper end of the ribs 50 as shown in FIG. 2. However, as shown in FIG. 4, upon installation of the filter element to the head 5, the filter element 25 will typically get displaced downward against the bias of the spring in a direction away from the head to create a gap between the inner end 26 of the threaded sleeve 22 and the upper ends of the ribs 50. The fluid flow paths or channels 58 are defined between the ribs 50, with the fluid able to flow under the end 26 of the threaded sleeve 22.

As shown in FIGS. 2 and 4, a gasket 76 can be provided at the nutplate end of the filter 10. In use, as shown in FIG. 4, the gasket 76 seals with the filter head 5 to prevent fluid leakage from the filter 10 to outside the filter.

Operation of the filter 10 will now be described with reference to FIG. 4. As an example, the filter 10 will be described as configured for outside-in flow, with the fluid flow paths 58 forming inlet flow paths for dirty fluid (in this example oil) to be filtered and the flow passageway 44 forming an outlet flow path for clean or filtered oil. However, it is to be realized that this description is exemplary only, and the filter can be configured for inside-out flow with the flow paths 58 forming outlet flow paths for filtered oil and the fluid passageway 44 forming an inlet flow path for dirty oil to be filtered.

As shown by the arrows in FIG. 4, dirty oil can enter the filter head 5 through one or more inlet passageways 70. The oil then flows radially outward over the top of the endplate 40 through the flow paths 58 and around the perimeter edge 56 of the endplate 40 to the outside of the media 30. The oil then flows through the filter media 30 where it is filtered and into the central cavity 36. Depending on whether an additive mechanism is used, some of the oil may flow through the additive mechanism. The filtered oil then flows upwardly through the flow passageway 44 of the sleeve 42 and through an outlet 72 in the filter head 5. As evident from FIG. 4, the seal 48 is disposed between the outlet 44a and the flow paths 58, thereby preventing dirty oil from bypassing the filter media and mixing with the filtered oil in the outlet 72, and vice-versa.

FIGS. 5-10 illustrate a filter 100 that is generally similar in construction to the filter 10 described in FIGS. 1-4. In FIGS. 5-10, elements that are similar or identical to elements in FIGS. 1-4, whether in construction and/or operation, will be referenced using the same reference numbers. The filter 100 is particularly suited for filtering fuel, such as diesel fuel, but can be used to filter other fluids as well.

One difference from the filter 10 is that the filter 100 includes a pre-fill cap 200 that is integrally formed with and closes an end of the first structure 42. The pre-fill cap 200 includes an outer perimeter edge 202 that overhangs a portion of the structure 42. For example, the diameter of the cap 200 can be generally equal to or larger than the diameter of the structure 42 or larger than the passageway 44.

One or more outlet holes 204 are formed in the structure 42 between the pre-fill cap 200 and the radial outward facing groove 46 that places the fluid flow passageway 44 of the structure 42 in communication with an exterior of the structure 42. The pre-fill cap 200 closes the end of the structure 42 to act as a deflector diverting contaminated filling fluid, such as fuel, to the dirty chamber of the filter as illustrated in FIG. 10 during a pre-filling procedure, preventing the dirty fuel from entering the clean side of the filter media. However, as shown in FIG. 9, the holes 204 permit the filtered fuel to flow from the fluid passageway 44 and into the outlet 72 of the filter head 5.

The filter 100 also differs from the filter 10 in that the filter 100 is not illustrated as including the optional additive mechanism. Instead, the coil spring 62 is in direct engagement with the endplate 38 to bias the filter element 25 into engagement with the nutplate 20.

Figure 8:
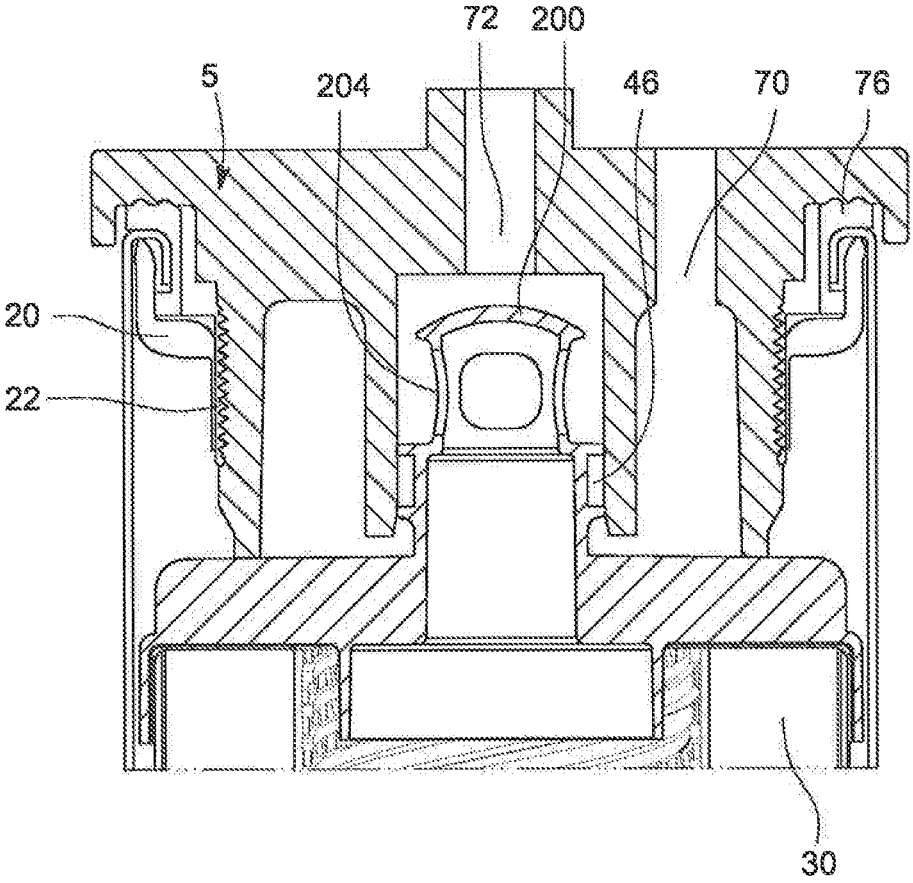
FIG. 8 is close-up view of the end of the fuel filter mounted to a filter head.

Operation of the filter 100 will now be described with reference to FIGS. 8 and 9. As an example, the filter 100 will be described as configured for outside-in flow, with the fluid flow paths 58 forming inlet flow paths for dirty fluid (in this example fuel) to be filtered and the flow passageway 44 forming an outlet flow path for clean or filtered fuel. However, it is to be realized that this description is exemplary only, and the filter can be configured for inside-out flow with the flow paths 58 forming outlet flow paths for filtered fuel and the fluid passageway 44 forming an inlet flow path for dirty fuel to be filtered.

Figure 9:
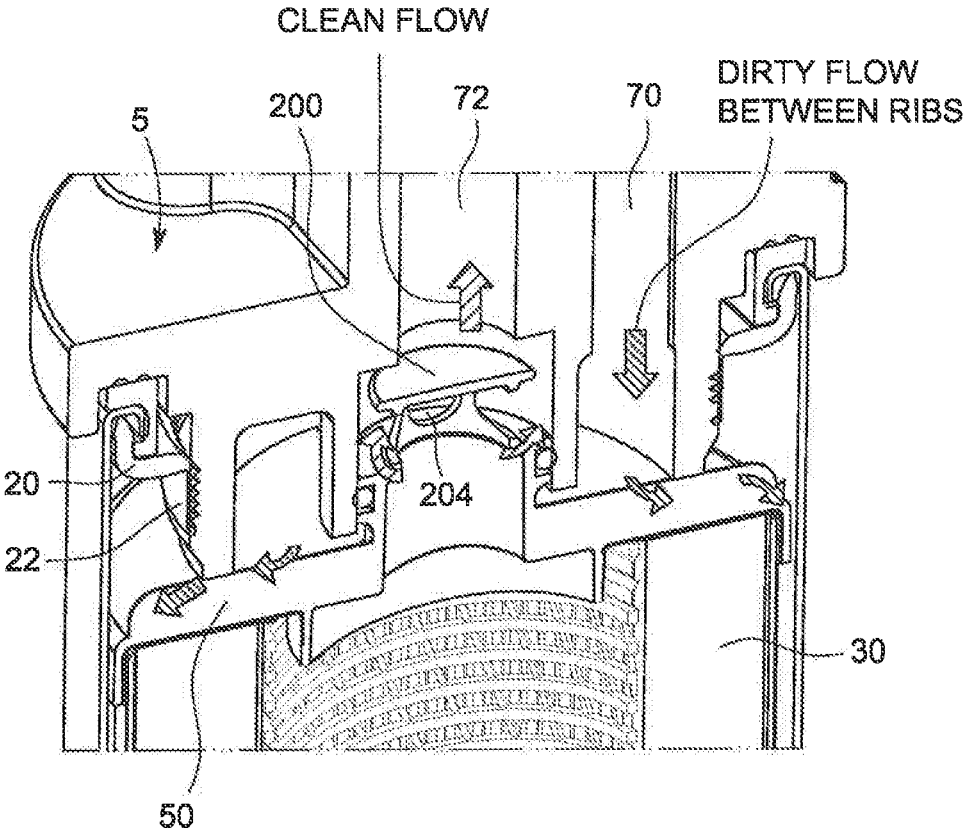
FIG. 9 is close-up view of the end of the fuel filter showing the inlet and outlet flow of the fuel.
Figure 10:
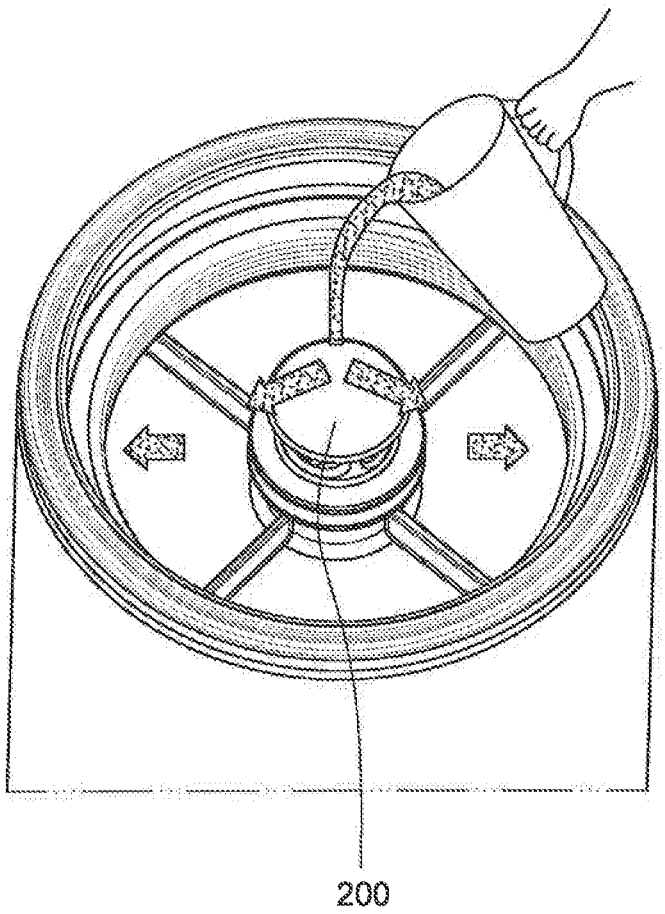
FIG. 10 illustrates the functioning of the pre-fill cap of the fuel filter element.

As shown by the arrows in FIG. 9, dirty fuel can enter the filter head 5 through one or more inlet passageways 70. The fuel then flows radially outward over the top of the endplate 40 through the flow paths 58 and around the perimeter edge 56 to the outside of the media 30. The fuel then flows through the filter media 30 where it is filtered and into the central cavity 36. The filtered fuel then flows upwardly through the flow passageway 44 of the structure 42, out the holes 204, and through the outlet 72 in the filter head 5. As evident from FIG. 9, the seal 48 prevents dirty fuel from bypassing the filter media and mixing with the filtered fuel in the outlet 72, and vice-versa.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter element, comprising:

a ring of filtration media having a first end and a second end and circumscribing a central cavity;

a first endplate sealingly attached to the first end of the filtration media;

a second endplate sealingly attached to the second end of the filtration media, the second endplate including a sleeve extending upwardly therefrom in a direction away from the first endplate, the sleeve defining a fluid flow passageway through the second endplate that is in fluid communication with the central cavity;

a radial outward facing groove formed in the sleeve that receives a seal therein;

a plurality of ribs formed on the second endplate and extending upwardly therefrom in the same direction as the sleeve, each rib extending from a first end on an outside surface of the sleeve to a second end adjacent an outer perimeter edge of the second endplate; and a pre-fill cap integrally formed with and closing an end of the sleeve, the pre-fill cap including an outer perimeter edge that overhangs a portion of the sleeve; and at least one hole formed in the sleeve between the pre-fill cap and the radial outward facing groove that places the fluid flow passageway in communication with an exterior of the sleeve.

2. The filter element of claim 1, wherein the first endplate is a closed endplate with no fluid flow passageways through the first endplate.

3. A filter element, comprising:

a ring of filtration media extending along a longitudinal axis and having a first end and a second end and circumscribing a central cavity;

a first endplate sealingly attached to the first end of the filtration media;

a second endplate sealingly attached to the second end of the filtration media, the second endplate including a first structure extending upwardly therefrom in a direction away from the first endplate coaxial to the longitudinal axis, the first structure defines a fluid flow passageway through the second endplate, the fluid flow passageway has an inlet that is in fluid communication with the central cavity and an outlet;

a seal disposed on the first structure that is positioned to seal with a filter head, the seal is positioned between the outlet and the second endplate;

a second structure integrally formed on the second endplate that defines a plurality of fluid flow paths along the top of the second endplate, the fluid flow paths are disposed on the same side of the second endplate as the first structure; and a pre-fill cap integrally formed with and closing the first structure at the outlet thereof, the pre-fill cap including an outer perimeter edge that overhangs a portion of the first structure; and at least one outlet hole formed in the first structure between the pre-fill cap and the seal that places the fluid flow passageway in communication with an exterior of the first structure.

4. The filter element of claim 3, wherein the second structure comprises a plurality of ribs integrally formed on the second endplate and extending upwardly therefrom in the same direction as the first structure, the ribs defining the fluid flow paths along the top of the second endplate.

5. The filter element of claim 4, wherein each rib extends in a radial direction from an outside surface of the first structure to adjacent an outer perimeter edge of the second endplate.

6. The filter element of claim 3, wherein the seal is disposed in a groove formed on an outside surface of the first structure.

7. The filter element of claim 3, wherein the first endplate is a closed endplate with no fluid flow passageways through the first endplate.

8. A filter, comprising:

a housing having a closed first end, a second end and an interior space;

a nutplate fastened to the second end of the housing, the nutplate including a threaded sleeve having interior threads for threadably connecting the filter to a filter head, the threaded sleeve having an inner end facing toward the interior space;

a filter element disposed in the interior space, the filter element including:

a ring of filtration media disposed in the interior space and extending along a longitudinal axis and having a first end and a second end and circumscribing a central cavity;

a first endplate sealingly attached to the first end of the filtration media;

a second endplate sealingly attached to the second end of the filtration media between the first endplate and the nutplate, the second endplate including a first structure extending upwardly therefrom in a direction away from the first endplate and radially inward from the threaded sleeve, the first structure is coaxial to the longitudinal axis, the first structure defines a fluid flow passageway through the second endplate, the fluid flow passageway has an inlet that is in fluid communication with the central cavity and an outlet;

a seal disposed on the first structure that is positioned to seal with the filter head when the filter is connected to the filter head, the seal is positioned between the outlet and the second endplate;

a second structure integrally formed on the second endplate that defines a plurality of fluid flow paths along the top of the second endplate, the fluid flow paths are disposed on the same side of the second endplate as the first structure; and a pre-fill cap integrally formed with and closing the first structure at the outlet thereof, the pre-fill cap including an outer perimeter edge that overhangs a portion of the first structure; and at least one outlet hole formed in the first structure between the pre-fill cap and the seal that places the fluid flow passageway in communication with an exterior of the first structure.

9. The filter of claim 8, wherein the second structure comprises a plurality of ribs integrally formed on the second endplate and extending upwardly therefrom in the same direction as the first structure, the ribs defining the fluid flow paths along the top of the second endplate, and the inner end of the threaded sleeve is engaged with an upper end of each rib.

10. The filter of claim 9, wherein each rib extends from a first end on an outside surface of the first structure to a second end adjacent an outer perimeter edge of the second endplate, and the second end is radially outside of the inner end of the threaded sleeve.

11. The filter of claim 8, further comprising a spring disposed between the first endplate and the closed first end of the housing, the spring is connected to the filter element and biases the filter element into engagement with the nutplate.

12. The filter of claim 8, wherein the seal is disposed in a groove formed on an outside surface of the first structure.

13. The filter of claim 8, wherein the first endplate is a closed endplate with no fluid flow passageways through the first endplate.

*14. A filter element, comprising:*

*a ring of filtration media having a first end and a second end and circumscribing a central cavity;*

*a first endplate sealingly attached to the first end of the filtration media;*

*a second endplate sealingly attached to the second end of the filtration media, the second endplate including a sleeve extending upwardly therefrom in a direction away from the first endplate, the sleeve defining a fluid flow passageway through the second endplate that is in fluid communication with the central cavity;*

*a radial outward facing groove formed in the sleeve that receives a seal therein;*

*a pre-fill cap integrally formed with and closing an end of the sleeve, the pre-fill cap including an outer perimeter edge that overhangs a portion of the sleeve; and at least one hole formed in the sleeve between the pre-fill cap and the radial outward facing groove that places the fluid flow passageway in communication with an exterior of the sleeve.*

*15. The filter element of claim 14, wherein the first endplate is a closed endplate with no fluid flow passageways through the first endplate.*

*16. A filter element, comprising:*

*a ring of filtration media extending along a longitudinal axis and having a first end and a second end and circumscribing a central cavity;*

*a first endplate sealingly attached to the first end of the filtration media;*

*a second endplate sealingly attached to the second end of the filtration media, the second endplate including a first structure extending upwardly therefrom in a direction away from the first endplate coaxial to the longitudinal axis, the first structure defines a fluid flow passageway through the second endplate, the fluid flow passageway has an inlet that is in fluid communication with the central cavity and an outlet;*

*a seal disposed on the first structure that is positioned to seal with a filter head, the seal is positioned between the outlet and the second endplate; and*

*a pre-fill cap integrally formed with and closing the first structure at the outlet thereof, the pre-fill cap including an outer perimeter edge that overhangs a portion of the first structure; and at least one outlet hole formed in the first structure between the pre-fill cap and the seal that places the fluid flow passageway in communication with an exterior of the first structure.*

*17. The filter element of claim 16, wherein the seal is disposed in a groove formed on an outside surface of the first structure.*

*18. The filter element of claim 16, wherein the first endplate is a closed endplate with no fluid flow passageways through the first endplate.*

*19. A filter, comprising:*

*a housing having a closed first end, a second end and an interior space;*

*a nutplate fastened to the second end of the housing, the nutplate including a threaded sleeve having interior threads for threadably connecting the filter to a filter head, the threaded sleeve having an inner end facing toward the interior space;*

*a filter element disposed in the interior space, the filter element including:*

*a ring of filtration media disposed in the interior space and extending along a longitudinal axis and having a first end and a second end and circumscribing a central cavity;*

*a first endplate sealingly attached to the first end of the filtration media;*

*a second endplate sealingly attached to the second end of the filtration media between the first endplate and the nutplate, the second endplate including a first structure extending upwardly therefrom in a direction away from the first endplate and radially inward from the threaded sleeve, the first structure is coaxial to the longitudinal axis, the first structure defines a fluid flow passageway through the second endplate, the fluid flow passageway has an inlet that is in fluid communication with the central cavity and an outlet;*

*a seal disposed on the first structure that is positioned to seal with the filter head when the filter is connected to the filter head, the seal is positioned between the outlet and the second endplate; and*

*a pre-fill cap integrally formed with and closing the first structure at the outlet thereof, the pre-fill cap including an outer perimeter edge that overhangs a portion of the first structure; and at least one outlet hole formed in the first structure between the pre-fill cap and the seal that places the fluid flow passageway in communication with an exterior of the first structure.*

*20. The filter of claim 19, further comprising a spring disposed between the first endplate and the closed first end of the housing, the spring is connected to the filter element and biases the filter element into engagement with the nutplate.*

*21. The filter of claim 19, wherein the seal is disposed in a groove formed on an outside surface of the first structure.*

*22. The filter of claim 19, wherein the first endplate is a closed endplate with no fluid flow passageways through the first endplate.*

* * * * *